(12) United States Patent
Lee et al.

(10) Patent No.: US 9,092,627 B2
(45) Date of Patent: Jul. 28, 2015

(54) APPARATUS AND METHOD FOR PROVIDING SECURITY INFORMATION IN VIRTUAL ENVIRONMENT

(75) Inventors: Sung-min Lee, Suwon-si (KR); Sang-bum Suh, Seoul (KR); Sang-dok Mo, Hwaseong-si (KR); Bok-deuk Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1067 days.

(21) Appl. No.: 12/490,620

(22) Filed: Jun. 24, 2009

(65) Prior Publication Data

US 2010/0132015 A1 May 27, 2010

(30) Foreign Application Priority Data

Nov. 21, 2008 (KR) .................. 10-2008-0116289

(51) Int. Cl.
| | | |
|---|---|---|
| *G06F 21/00* | (2013.01) | |
| *G06F 21/57* | (2013.01) | |
| *G06F 21/50* | (2013.01) | |
| *G06F 21/10* | (2013.01) | |
| *G06F 21/53* | (2013.01) | |
| *G06F 21/62* | (2013.01) | |
| *G06F 9/455* | (2006.01) | |

(52) U.S. Cl.
CPC ............ *G06F 21/57* (2013.01); *G06F 9/45558* (2013.01); *G06F 21/10* (2013.01); *G06F 21/50* (2013.01); *G06F 21/53* (2013.01); *G06F 21/6218* (2013.01); *G06F 2009/45587* (2013.01)

(58) Field of Classification Search
CPC ...... G06F 21/10; G06F 21/6218; G06F 21/53; G06F 21/52; G06F 21/31; G06F 21/83; G06F 2221/2103; G06F 21/50
USPC ................................ 726/3; 709/203; 719/328
See application file for complete search history.

(56) References Cited

U.S. PATENT DOCUMENTS

| 7,222,062 B2 * | 5/2007 | Goud et al. ..................... 703/23 |
| 7,269,719 B2 | 9/2007 | Colavin et al. |

(Continued)

FOREIGN PATENT DOCUMENTS

| KR | 10-2007-0085746 | 8/2007 |
| KR | 10-2008-0034810 A | 4/2008 |

(Continued)

OTHER PUBLICATIONS

Korean Office Action issued on Feb. 17, 2015 by the Korean Intellectual Property Office in counterpart Korean Application No. 10-2008-0116289 (5 pages in Korean and an English Translation).

*Primary Examiner* — Mohammad A Siddiqi
(74) *Attorney, Agent, or Firm* — NSIP Law

(57) ABSTRACT

An apparatus and method of providing security information in a virtual environment that supports a plurality of operating systems. The plurality of operating systems include at least one secure operating system in which applications whose safety has been verified are installed, and at least one normal operating system in which applications whose safety has been not verified are freely installed. The server operating system may provide security information corresponding to an operating system in which an application executed as foreground is installed, to provide information indicating whether an application is operated in a secure operating system, to a user.

23 Claims, 7 Drawing Sheets

(56) References Cited

U.S. PATENT DOCUMENTS

| | | | |
|---|---|---|---|
| 7,287,152 B2 | 10/2007 | Wilson | |
| 7,302,557 B1 | 11/2007 | Hwu et al. | |
| 7,493,498 B1* | 2/2009 | Schmidt et al. | 713/193 |
| 7,765,544 B2* | 7/2010 | Brickell et al. | 718/1 |
| 2003/0030680 A1* | 2/2003 | Cofta et al. | 345/864 |
| 2004/0123118 A1* | 6/2004 | Dahan et al. | 713/189 |
| 2005/0091530 A1* | 4/2005 | Avraham et al. | 713/201 |
| 2007/0089111 A1* | 4/2007 | Robinson et al. | 718/1 |
| 2007/0101435 A1* | 5/2007 | Konanka et al. | 726/27 |
| 2008/0092236 A1 | 4/2008 | Morgan | |
| 2008/0162312 A1* | 7/2008 | Sklovsky et al. | 705/35 |
| 2008/0307180 A1* | 12/2008 | Hattori et al. | 711/163 |
| 2009/0083862 A1* | 3/2009 | Avraham et al. | 726/34 |
| 2009/0204964 A1* | 8/2009 | Foley et al. | 718/1 |
| 2010/0070870 A1* | 3/2010 | Halperin et al. | 715/742 |

FOREIGN PATENT DOCUMENTS

| | | |
|---|---|---|
| KR | 10-2008-0083417 | 9/2008 |
| WO | WO 2006/061996 | 6/2006 |

* cited by examiner

APPARATUS AND METHOD FOR PROVIDING SECURITY INFORMATION IN VIRTUAL ENVIRONMENT

CROSS REFERENCE TO RELATED APPLICATION(S)

This application claims the benefit under 35 U.S.C. §119 (a) of a Korean Patent Application No. 10-2008-0116289, filed on Nov. 21, 2008, the disclosure of which is incorporated herein in its entirety by reference.

BACKGROUND

1. Field

The following description relates to an apparatus and method of supporting a plurality of operating systems, and more particularly, an apparatus and method of providing security information in a virtual environment that supports a plurality of operating systems.

2. Description of the Related Art

With the rapid development of personal mobile devices and Internet technologies, information and new software have both become easily accessible and more easily shared. Although easy access to new information and/or software is seemingly beneficial to users, the availability and safety of mobile devices may be compromised due to this unmonitored free-flow of information.

Free sharing of information and free use of new software in mobile devices may lead to distribution of malicious and/or unexpected software which may cause malfunction of the mobile devices and leak users' important and/or confidential information. Although virtualization technology exists to resolve this problem, most of the research currently underway is related to a virtual machine monitor (VMM).

SUMMARY

In one general aspect, there is provided an apparatus to support a plurality of operating systems, the plurality of operating systems including a server operating system to provide an integrated user interface corresponding to applications which are executed on the plurality of operating systems, and a client operating system to provide a user interface corresponding to applications existing on the client operating system through the server operating system, wherein the server operating system stores security information indicating security levels corresponding to the plurality of operating systems, and controls an output to provide corresponding security information to an operating system on which an application is executed.

The plurality of operating systems may include at least one secure operating system in which applications whose safety has been verified are installed, and at least one normal operating system in which applications whose safety has been not verified are freely installed.

The output to provide the corresponding security information to the operating system may include at least one of an indication of the corresponding security information on an application execution screen, an indication of the corresponding security information on predetermined hardware of the apparatus, predetermined sound, and a predetermined pattern vibration.

The server operating system may control an output to provide corresponding security information to an operating system in which an application executed as foreground among the applications is installed.

The security information corresponding to each of a plurality of operating systems may be variable.

The server operating system may include a security information storage unit to store security information corresponding to the plurality of operating systems, an access controller to determine whether to permit an access request to access the security information from any one of the plurality of operating systems, based on the security information corresponding to the plurality of operating systems, and a security information output controller to output security information corresponding to the executed application.

The access controller may determine whether the access request is received from a secure operating system in which applications whose safety has been verified are installed, and ignores the access request where the access request is not received from the secure operating system.

The access request may include a request to output the security information in a security information output area included in an application execution window or device or to change content of security information to be output.

The apparatus may include a hardware access controller to determine whether the access request is received from a secure operating system in which applications whose safety has been verified are installed in response to a device driver issuing an access request use hardware resources that provide security information, and ignoring the access request where the request is not received from the secure operating system.

The hardware access controller may be located in a virtual machine monitor (VMM) layer.

The access request from the device driver may be made upon installation initialization or update of the device driver.

In another general aspect, there is provided a method of supporting a plurality of operating systems including a server operating system and at least one client operating system, the method including reading, by the server operating system, security information indicating a security level corresponding to each of the plurality of operating systems, and controlling, by the server operating system, an output to provide security information corresponding to an operating system in which an executed application is installed, based on the read security information.

The output to provide the corresponding security information to the operating system may include at least one of an indication of the corresponding security information on an application execution screen, an indication of the corresponding security information on predetermined hardware of the apparatus, predetermined sound, and a predetermined pattern vibration.

The controlling of the output may include controlling, at the server operating system, an output to provide corresponding security information to an operating system in which an application executed as foreground among the applications is installed.

The security information corresponding to each of the plurality of operating systems may be changeable.

The controlling of the output may include receiving an access request to access the security information, determining whether the access request is received from a secure operating system in which applications whose safety has been verified are installed, and ignoring the access request where the access request is not received from the secure operating system.

The access request may include a request to output the security information in a security information output area included in an application execution window or an application execution device or to change content of security information to be output.

The method may further include, in response to a device driver issuing an access request to use a hardware resource providing security information, determining whether the access request is received from a secure operating system in which applications whose safety has been verified are installed, and ignoring the access request where the access request is not received from the secure operating system.

The access request may be made upon installation initialization or update of the device driver.

Another general aspect provides a computer-readable recording medium having a program recorded thereon for implementing a method for supporting a plurality of operating systems including a server operating system and at least one client operating system, the method including reading, at the server operating system, security information indicating a security level corresponding to each of the plurality of operating systems, and controlling, at the server operating system, an output to provide corresponding security information to an operating system on which an application is executed, based on the read security information.

Other features and aspects will be apparent from the following detailed description, the drawings, and the claims.

Figure 1:
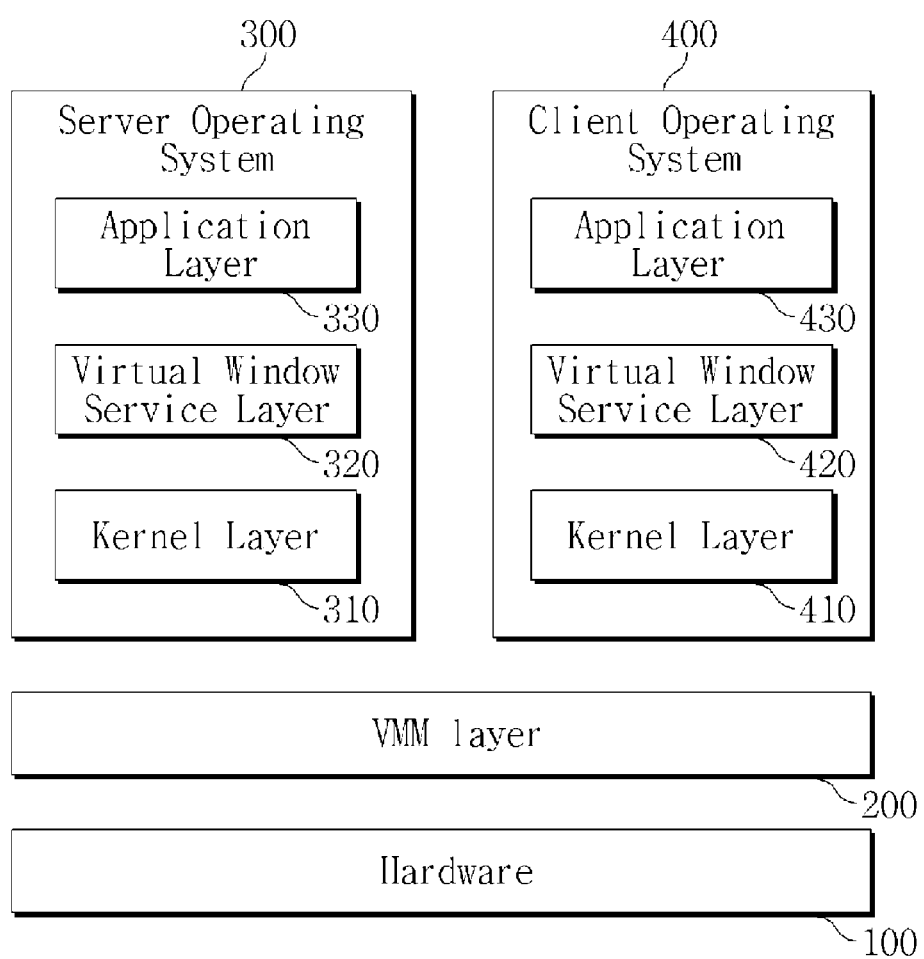
FIG. 1 is a block diagram illustrating a system architecture of an exemplary apparatus to provide security information in a virtual environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a system architecture of an exemplary apparatus to provide security information in a virtual environment.

The system architecture of the apparatus to support a plurality of operating systems 300 and 400 enables a hardware 100 to support a plurality of operating execution environments. As illustrated in FIG. 1, the apparatus may be based on a virtual machine monitor (VMM) layer 200. The VMM layer 200 can provide an inter-domain communication (IDC) channel as a safer communication channel than a network used among several domains operating on VMM. The VMM layer 200 may include software, such as VMM, Hypervisor, L4, etc.

The apparatus to support a plurality of operating systems 300 and 400 may be implemented by various terminal apparatuses, such as mobile phones, mobile Internet devices (MIDs), digital televisions (DTVs), personal digital assistants (PDAs), ultra mobile PCs (UMPCs), etc., and may have any type or form.

Although the plurality of operating systems 300 and 400 use the single hardware 100, the operating systems 300 and 400 operate as if they each correspond to separate hardware. A number of operating systems (or domains) that may operate on one system is limited only by hardware resources. In FIG. 1, although only one of each of the server operating system (virtual window service server) 300 and the client operating system (virtual window service client) 400 are illustrated, there may be more than one client operating system.

In this disclosure, a domain refers to an environment in which each operating system operates. A domain application refers to an application existing and executed in a predetermined operating system or a domain that is an environment in which the operating system operates. For example, a domain #1 application is an application existing and operating in the operating system #1. Typically, an environment in which the server operating system operates is called domain #0.

According to an exemplary embodiment, there is one operating system that operates as the server operating system 300 among the above various operating systems. This operating system directly controls human interface device (HID) hardware. The HID hardware is a user interface device to directly interact with a user by receiving an input from the person and providing an output to the person. Typical HID hardware may include a keyboard, a mouse, a track ball, a touch pad, a graphic tablet, a joystick, etc. Other client operating systems including the client operating system 400 are connected to the server operating system 300 over a network or an inter-domain communication (IDC) and make a request corresponding to HID use.

The server operating system 300 provides an integrated user interface corresponding to applications executed on a plurality of operating systems. The client operating system 400 provides a user interface corresponding to applications existing on the client operating system 400 through the server operating system 300, which are controlled by the server operating system 300.

The operating systems 300 and 400 may include kernel layers 310 and 410 to communicate with other operating systems, virtual window service (VWS) layers 320 and 420 to provide an integrated user interface corresponding to applications installed in a plurality of operating systems, and application layers 330 and 430, respectively.

The plurality of operating systems may include at least one secure operating system in which applications whose safety has been verified are driven, and at least one normal operating system in which applications whose safety has been not verified may be freely installed. The server operating system 300 is a secure operating system, and the client operating system 400 may be operated as a secure operating system or a normal operating system. For example, the secure operating system may be an operating system in which only applications installed upon apparatus manufacture and shipping operate or only applications whose safety has been verified are installed and executed.

According to an exemplary embodiment, the server operating system 300 may store security information indicating security levels corresponding to the plurality of operating systems, and control an output to provide the corresponding security information to an operating system in which an application is executed. The security information may indicate at least one security level. For example, the security information may be represented as "domain 0: Secure, domain 1: Non-secure, . . . , domain N: Non-secure".

The server operating system 300 may control an output to provide corresponding security information to an operating system in which an application executed as foreground among the applications is installed. Security information assigned to each of the plurality of operating systems may be, for example, changed as the security state of the operating system is changed.

Figure 2:
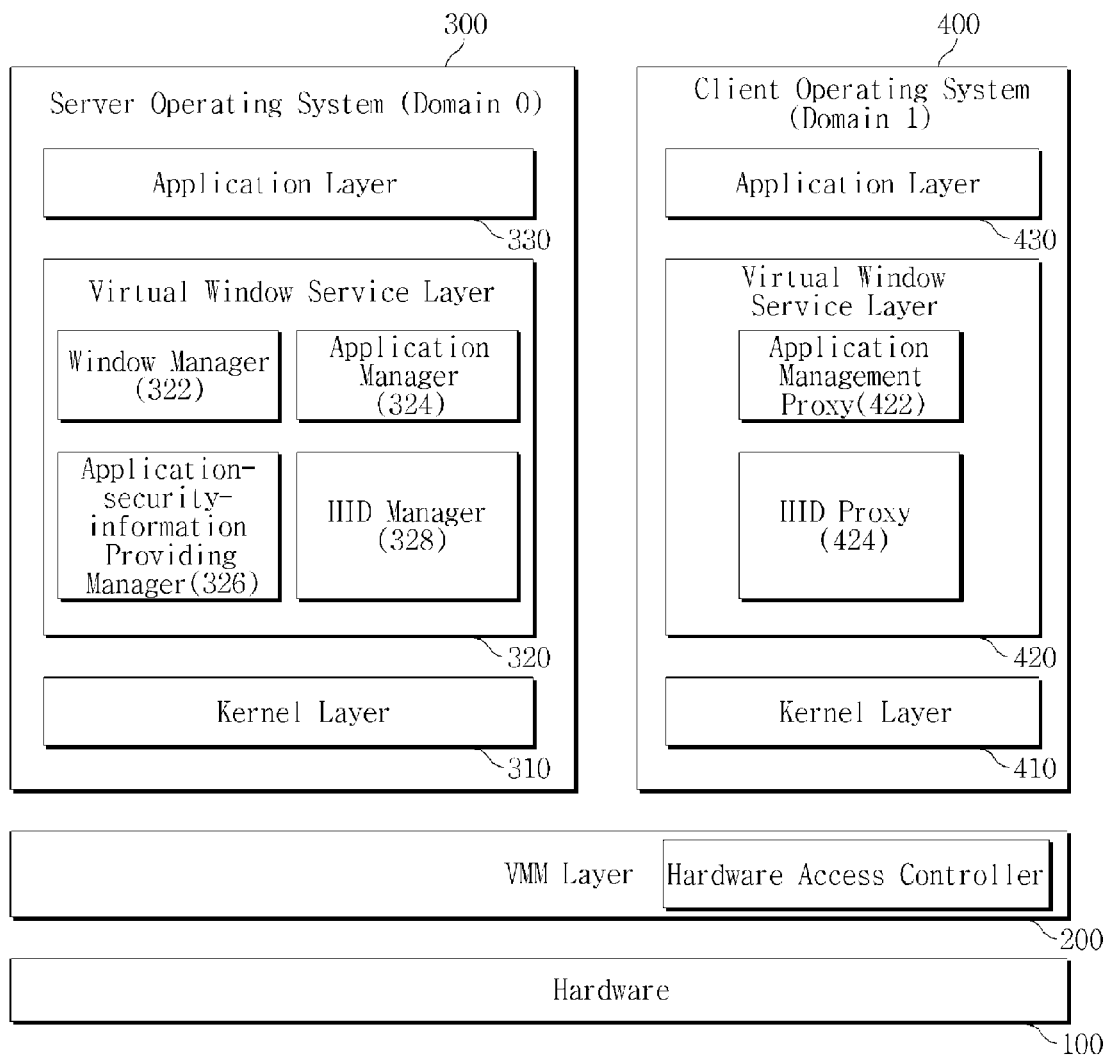
FIG. 2 is a block diagram illustrating a system architecture of another exemplary apparatus to provide security information in a virtual environment.

FIG. 2 illustrates a system architecture of another exemplary apparatus to provide security information in a virtual environment.

In the server operating system 300, a virtual window service layer 320 may include a window manager 322, an application manager 324, an application-security-information providing manager 326, and a human interface device (HID) manager 328.

The window manager 322 manages application windows from several domains. The window manager 322 manages an arrangement order of execution windows of a plurality of applications in response to the applications being executed.

The application manager 324 manages configuration, installation and execution of the applications.

The application manager 324 stores various information related to the application configuration, i.e., meta information of the application, and manages the stored information. For example, the application manager 324 may store and manage a location (path) of an execution file of each application, a location (path) of an icon, information on a domain to which the application belongs, etc.

The application manager 324 may install new applications (or software). In this case, the application manager 324 may perform decompression of an application package to be installed, verification of applications, file copy, etc. In response to a user input signal requesting application installation being received, the application manager 324 selects an operating system in which the application is to be installed, installs the application in the selected operating system, and registers application-related information including an application installation path. In response to the application being installed in another domain, for example, in domain 1, the application manager 324 requests an application management proxy 422 of the client operating system 400 operating in domain 1 to install the application. After the application is installed, the application management proxy 422 stores information related to the application installation (e.g., locations of an execution file, an icon, etc.).

The application manager 324 controls and manages operations, such as application execution and termination. For example, in response to a user clicking icon #1, the application manager 324 receives a request to execute an application associated with icon #1 from a main application. The application manager 324 then executes the application, based on information required to perform application execution, e.g., information on a domain to which the application belongs, a location of an execution file, etc. Meanwhile, where the application to be executed is in another domain, the application manager 324 requests an application management proxy of another domain to execute the application.

The application-security-information providing manager 326 stores security information which indicates security levels corresponding to the plurality of operating systems, and controls an output to provide security information indicating a security level of an operating system in which an application is executed, to the operating system.

In order to indicate security information corresponding to an operating system in which an executed application is installed, the application-security-information providing manager 326 may display the corresponding security information on an application execution screen, e.g., in a specific area of the screen or display the corresponding security information using hardware of the apparatus. The application-security-information providing manager 326 may output the security information corresponding to an operating system of the executed application in the form of a specific sound or a specific pattern vibration using apparatus hardware. Further, the security information corresponding to the executed application may be output using one or a combination of the above-described output methods.

The HID manager 328 controls the user interface device. The HID manager 328 displays a GUI screen and outputs sound using a frame buffer driver, and delivers predetermined application input from the user to a corresponding application.

A function of displaying security information corresponding to an operating system in which the executed application is installed on the application execution screen in order to indicate the security information, which is performed by the application security information providing manager 326, may be implemented to be performed in the window manager 322. Meanwhile, a function of displaying the security information in some hardware of the apparatus or outputting it in a specific sound or a specific pattern vibration using the hardware of the application-security-information providing manager 326 may be implemented to be performed in the HID manager 328.

In addition, the virtual window service layer 320 may include a software system to facilitate building a GUI program, i.e., widget that may be a GUI library that is available for applications such as GTK+, QT, or Motif to display a screen.

The application layer 330 may include an application installer (or a software installer), a main application, and various applications. The application installer is an application to install various applications or software, and performs interfacing with the user. Actual internal installation operation is performed by the application manager 324. The main application may collectively show icons of applications operating in several domains, e.g., domains #1 and #2 on one screen. The main application plays a similar role to a palmtop environment (PE), a GPE palmtop environment (GPE), a QT palmtop environment (QPE), etc.

Meanwhile, the client operating system 400 includes a kernel layer 410, a virtual window service layer 420, and an application layer 430, like the server operating system 300.

The virtual window service layer 420 may include an application management proxy 422, a HID proxy 423, etc.

The application management proxy 422 installs an application in a correct location in response to a request from the application manager 324, or controls and manages operations such as execution and termination of the application in response to an application execution request. Where a user input signal to execute an application is received and the requested application is an application executed on the client operating system, the application manager 324 may request the application management proxy 422 to execute the requested application, receive an application execution result from the application management proxy 422, and provide the application execution result to the user. The application management proxy 422 may update a list of currently executed applications. Meanwhile, where a user input signal to request application termination is received and the requested application is an application executed in the client operating system, the application manager 324 requests the application management proxy 422 to terminate the application.

The HID proxy 424 serves to relay communication between an application in the same domain as the HID proxy 424 and the HID manager 328 while communicating with the HID manager 328. Where the executed application is in domain 1, the HID manager 328 receives necessary information from the HID proxy 424 in a domain in which the application operates and displays a screen or outputs sound. Further, where an input from the user is to be delivered to an application in another domain, the HID manager 328 delivers the user input to the HID proxy 424, which delivers the user input to the application.

As described above, in the system to support a plurality of operating systems, an execution result of an application operating in the client operating system is delivered to the user interface device via the server operating system. However, a device driver may be installed in the non-secure client operating system, independently from the server operating system. Accordingly, the device driver may directly access the hardware 100 and delete or change security information corresponding to the executed application.

Where an access request to use hardware resources providing security information is received from the device driver, a hardware access controller 210 in the VMM layer 200 determines whether the access request is received from a secure operating system in which applications whose safety has been verified are installed. Where the request is not received from the secure operating system, the hardware access controller 210 then ignores the request and blocks the access.

The hardware access request from the device driver may be made while the operating system 400 assigns resources necessary corresponding to a hardware apparatus, e.g., interrupt upon installation initialization or update of the device driver. Accordingly, a device driver solely installed in a non-secure client operating system can be blocked from accessing an output channel corresponding to security information of the operating system that is output.

Figure 3:
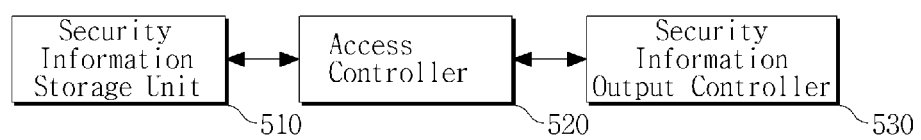
FIG. 3 is a block diagram illustrating an exemplary security information providing apparatus.

FIG. 3 illustrates an exemplary security information providing apparatus.

A security information storage unit 510 stores security information corresponding to each of a plurality of operating systems.

An access controller 520 reads the security information of the plurality of operating systems from the security information storage unit 510, and determines whether to permit a request for access to the security information from the plurality of operating systems, based on the read security information. According to an exemplary embodiment, the access controller 520 blocks a domain other than a secure domain, such as a server system, from indicating erroneous security information or changing existing content in a specific location on a window. Further, the access controller 520 performs the same function as the above hardware access controller 210 to directly access a hardware apparatus to indicate a security level in a domain other than a secure domain in virtualization software and prevent an output of erroneous security information.

The security information output controller 530 controls to output security information corresponding to an operating system in which an executed application is installed. An output to provide the security information corresponding to an operating system in which an executed application is installed may include at least one of an indication of corresponding security information in a specific area of an application execution screen, an indication of the corresponding security information in specific hardware of the apparatus, a specific sound, and a specific pattern vibration.

According to an exemplary embodiment, information indicating whether an executed application is a secure application provided on the secure operating system may be provided. Accordingly, a phishing attack from downloaded malicious ware may be essentially blocked. Where malicious ware is executed in a non-secure operating system, the user may easily confirm a security state, which makes it possible to essentially block leakage of security information, such as personal information necessary for Internet banking, electronic commerce, etc.

Figure 4:
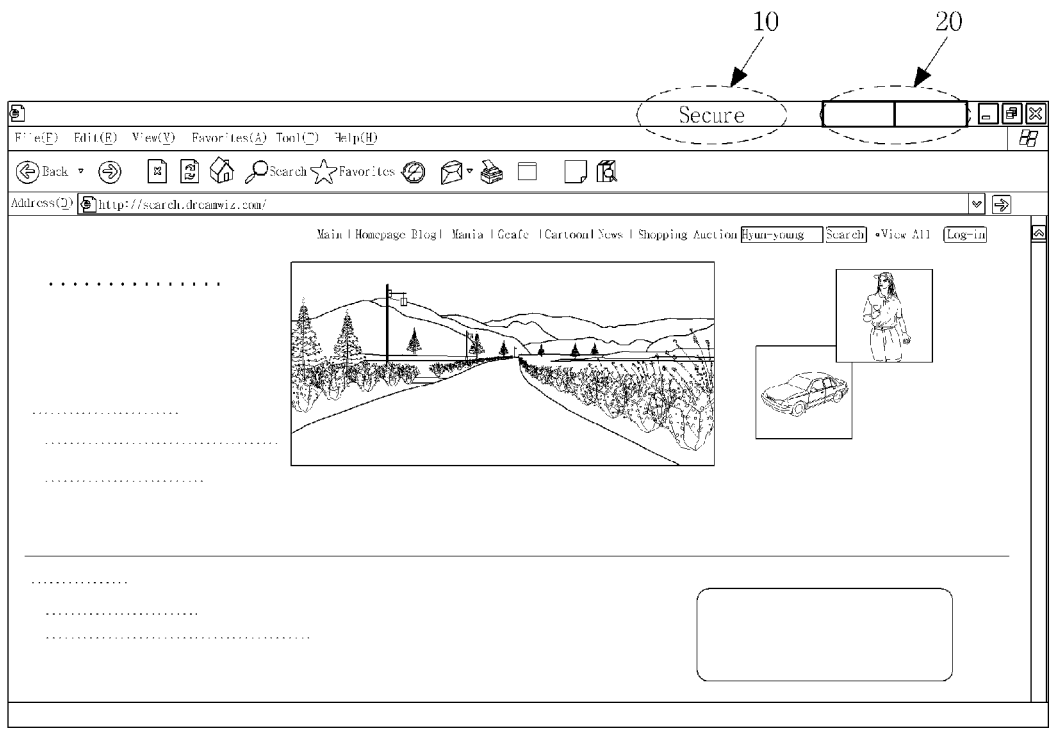
FIG. 4 is a diagram illustrating an example in which security information corresponding to an operating system in which an executed application is installed, is displayed in a specific area of a display window.

FIG. 4 illustrates an example in which security information corresponding to an operating system in which an executed application is installed, is displayed in a specific area of a display window.

An output to provide security information corresponding to an operating system in which an executed application is installed may be displayed as text, such as "Secure" 10, or a graph 20 indicating a security level, as illustrated in part of an application execution screen. In addition, a color pattern, an image pattern, etc. are available in various forms to indicate the security information or security level corresponding to an operating system in which an executed application is installed.

Figure 5:
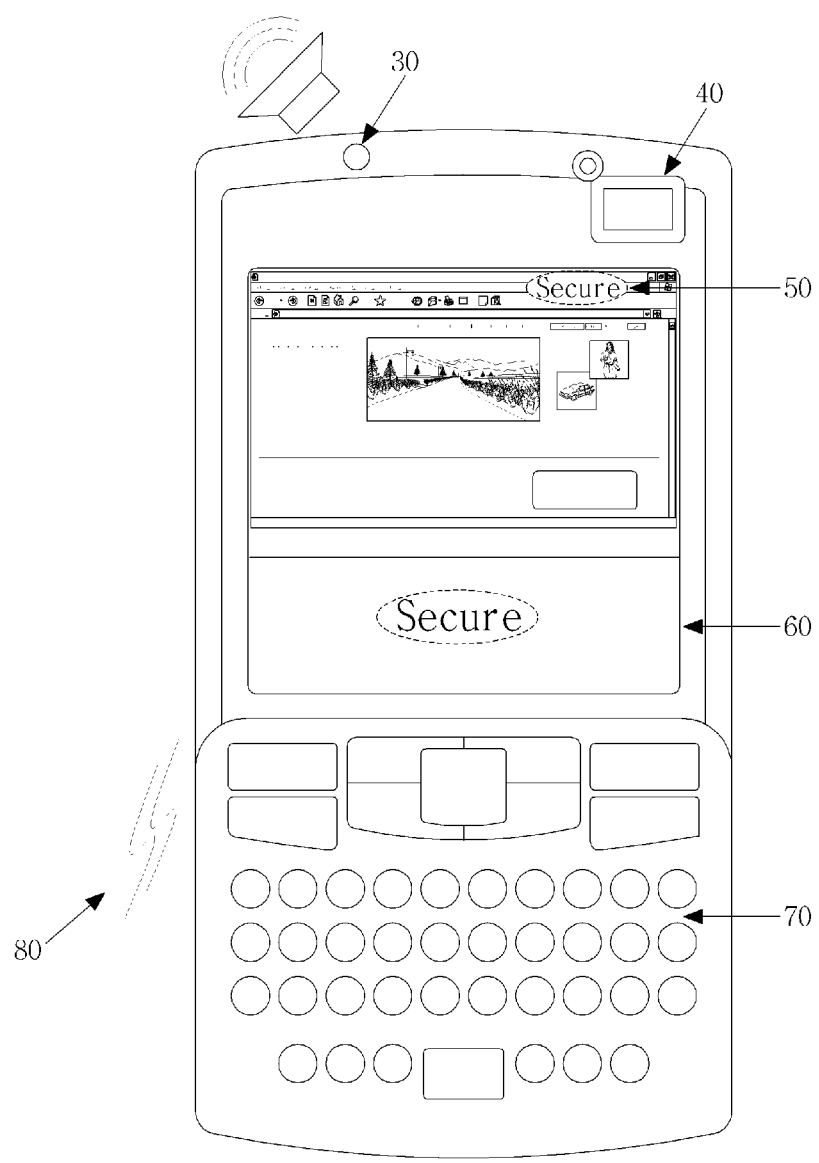
FIG. 5 is a diagram for illustrating various methods of outputting security information corresponding to an application executed in a portable phone, to provide security information.

FIG. 5 illustrates various methods of outputting security information corresponding to an application executed in a portable phone, to provide security information.

Referring to FIG. 5, where the apparatus to provide security information according to an exemplary embodiment is a portable phone, an output to provide security information corresponding to an operating system in which an executed application is installed may provide the security information using an application execution window or some hardware of the apparatus. A specific sound 30, such as an alert sound, may be output. A new hardware component 40 to display security information may be used.

Further, the security information may be displayed as text 50 in a specific portion of the window, as illustrated in FIG. 4. Alternatively, the security information may be displayed on a specific portion 60 of a display device using a frame buffer driver. Alternatively, a backlight in a key pad 70 flash at a high speed according to the security information, and vibration 80 in a specific pattern may be generated to output the security information.

Figure 6:
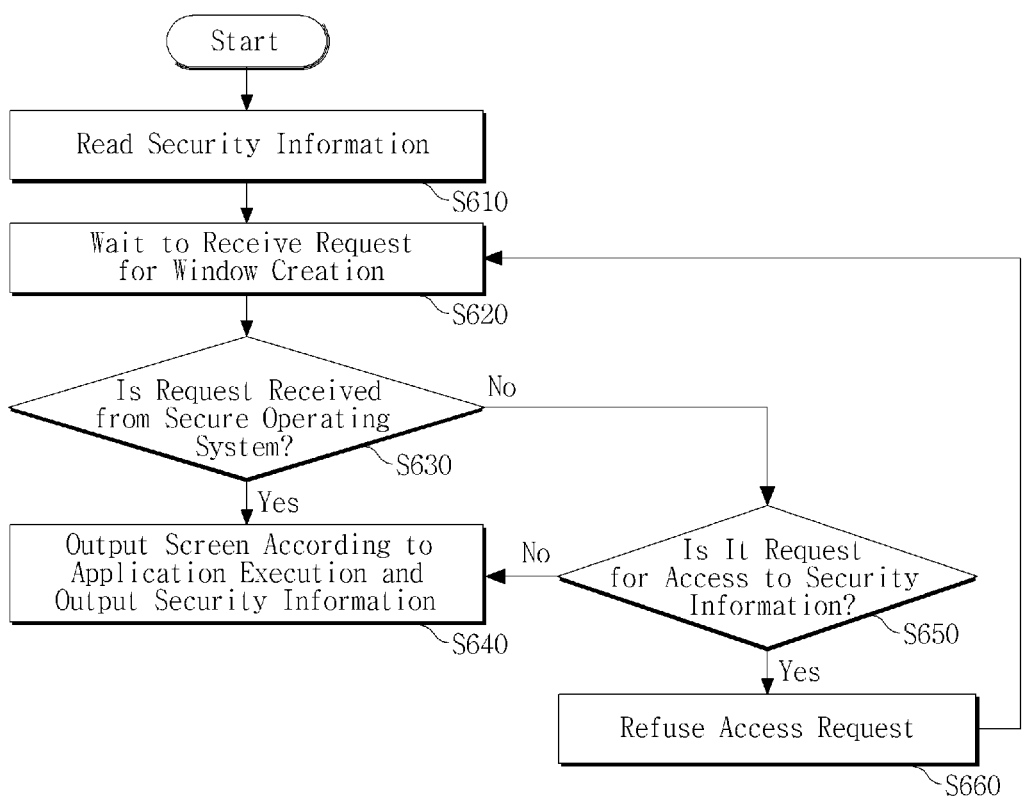
FIG. 6 is a flowchart illustrating an exemplary method of creating a window and outputting security information in a virtual environment.

FIG. 6 is a flowchart illustrating an exemplary method of creating a window and outputting security information in a virtual environment.

In operation S610, the server operating system 300 reads security information assigned to each of a plurality of operating systems.

The server operating system 300 waits to receive a request corresponding to application window creation from each operating system in operation S620. Upon receipt of the request corresponding to application window creation, the server operating system 300 determines whether the window creation request is received from a secure operating system in operation S630.

Where the window creation request is received from the secure operating system, the server operating system 300 creates an application execution window in response to the request, and outputs the security information corresponding to an operating system in which the executed application is installed, i.e., security information indicating "Secure" via at least one output channel in operation S640. The output channel may be a specific portion of the window, a frame buffer, or a specific apparatus of hardware.

In response to the window creation request being received from a non-secure operating system in operation S630, the server operating system 300 determines whether another software component inside the application or the non-secure operating system which makes the window creation request requests access to the security information output in operation S650. For example, the server operating system 300 may check to verify whether the component tries to display information in a security-information display area of the window.

Where it is determined that a request to access security information output is received from an application or system software executed on the non-secure operating system, the server operating system 300 ignores the request in operation S660. Where the application executed on the non-secure operating system does not make the request to access the security information output, the server operating system 300 creates an application execution window and outputs the security information corresponding to the operating system in which the executed application is installed, i.e., security information indicating "Non-secure" through at least one output channel in operation S640.

Figure 7:
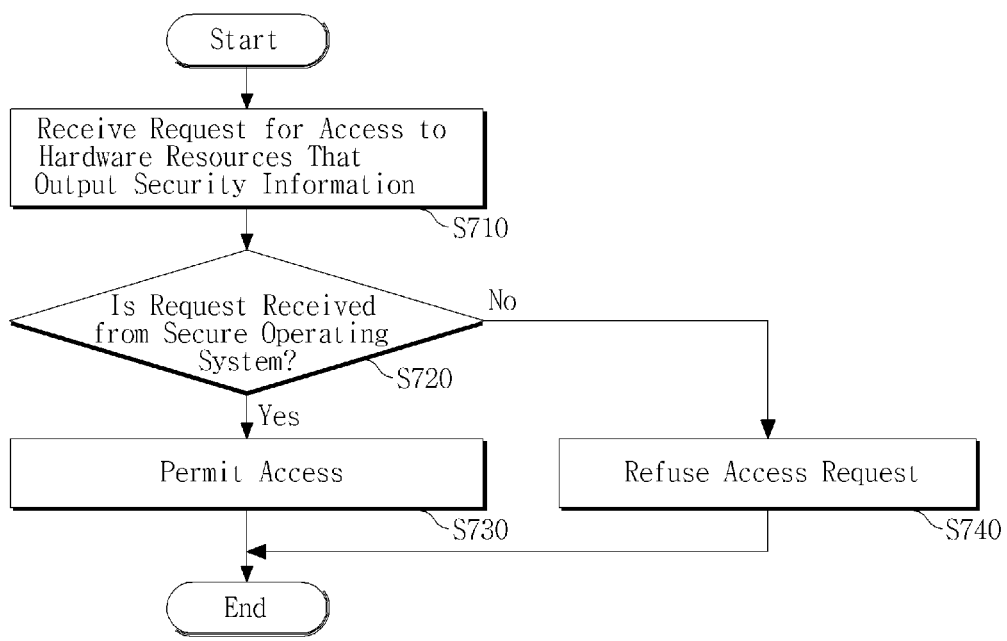
FIG. 7 is a flowchart illustrating an exemplary process of blocking access to hardware resources that output security information from a non-secure operating system.

FIG. 7 is a flowchart illustrating an exemplary process of blocking access to hardware resources that output security information from a non-secure operating system.

According to an exemplary embodiment, the hardware access controller 210 blocks a request to access hardware resources that output security information from a non-secure operating system, through the following process. Even where the non-secure operating system installs a native driver in a kernel to directly access the hardware apparatus to output security information, the hardware access controller 210 may block assignment of resources such as an IO memory, IRQ, etc. to the native driver corresponding to the non-secure domain so that the native driver cannot directly access the hardware resources.

The hardware access controller 210 receives a request to access the hardware resources that output security information in operation S710. The hardware access controller 210 determines whether the request is received from a secure operating system in operation S720.

Where the request is received from a secure operating system, such as the server operating system in operation S720, the hardware access controller 210 permits the access to hardware resources in operation S730. In respond to the request being received from a non-secure operating system in operation S720, the hardware access controller 210 ignores the request and essentially blocks the non-secure operating system from accessing the hardware that outputs security information, e.g., a keypad backlight, an LED, etc. and indicating erroneous information in operation S740.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. The computer-readable medium may be distributed to computer systems over a network, in which computer-readable codes or program instructions may be stored and executed in a distributed manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus, comprising:
a plurality of operating systems executing in a mobile device, comprising
a server operating system that
provides an integrated user interface to execute applications on the plurality of operating systems,
determines whether an operating system on which an application is executed is a secure operating system in response to a window creation request by the operating system, the secure operating system being an operating system in which applications, whose safety has been verified, are installed, and
controls an output provided via the mobile device that provides security information of the operating system based on the determination of whether the operating system is a secure operating system, the output comprising at least one of an indication of the security information of the operating system on an application execution screen, an indication of the security information of the operating system on predetermined hardware of the apparatus, a predetermined sound, and a predetermined pattern vibration; and
a client operating system that provides a user interface to applications on the client operating system through the server operating system; and
a security information storage unit configured to store security information indicating a security level for each of the plurality of operating systems,
wherein the server operating system refuses an attempt by the operating system to access the security information of the operating system in response to the window creation request by the operating system, and determining the operating system is a non-secure operating system.

2. The apparatus of claim 1, wherein the plurality of operating systems comprise:
at least one secure operating system in which applications, whose safety has been verified, are installed; and at least one normal operating system in which applications, whose safety has been not verified, are freely installed.

3. The apparatus of claim 2, wherein
the server operating system is a secure operating system, and
the security levels indicate whether an operating system is a normal operating system or a secure operating system.

4. The apparatus of claim 1, wherein the server operating system controls the output that provides security information of an operating system in which an application to be executed in a foreground among other applications is installed.

5. The apparatus of claim 1, wherein the security information of each of the plurality of operating systems is changeable.

6. The apparatus of claim 1, wherein the server operating system comprises:
an access controller that determines whether to permit an access request to access the security information received from the operating system, based on the security information of the operating system; and
a security information output controller that outputs the security information of the operating system corresponding to the executed application.

7. The apparatus of claim 6, wherein the access controller determines whether the access request is received from the secure operating system, and
ignores the access request where the access request is not received from the secure operating system.

8. The apparatus of claim 7, wherein the access request comprises a request to output the security information to a security information output area included in an application execution window or an application execution device, or a request to change content of security information to be output.

9. The apparatus of claim 1, further comprising:
a hardware access controller that
determines whether the access request is received from the secure operating system in response to a device driver issuing an access request to use a hardware resource providing security information, and
ignores the access request where the request is not received from the secure operating system.

10. The apparatus of claim 9, wherein the hardware access controller is located in a virtual machine monitor (VMM) layer.

11. The apparatus of claim 9, wherein the access request from the device driver is made upon installation initialization or update of the device driver.

12. The apparatus of claim 1, wherein the security information of the operating system is output as a graph indicating a security level of the operating system.

13. A method of supporting a plurality of operating systems executing in a mobile device, the operating systems comprising a server operating system and at least one client operating system, the method comprising:
reading, at the server operating system, security information indicating a security level of each of the plurality of operating systems;
in response to a window creation request by an operating system, determining, at the server operating system, whether the operating system on which an application is executed is a secure operating system in which applications, whose safety has been verified, are installed, and
controlling, at the server operating system, an output provided via the mobile device that provides security information of the operating system, based on the determining of whether the operating system is a secure operating system, the output comprising at least one of an indication of the security information of the operating system on an application execution screen, an indication of the security information of the operating system on predetermined hardware of the apparatus, a predetermined sound, and a predetermined pattern vibration;
wherein the server operating system refuses an attempt by the operating system to access the security information of the operating system in response to the window creation request by the operating system, and determining the operating system is a non-secure operating system.

14. The method of claim 13, wherein the controlling of the output comprises controlling, at the server operating system, an output to provide the security information of the operating system in which the application to be executed in a foreground among other applications is installed.

15. The method of claim 13, wherein security information of each of the plurality of operating systems is changeable.

16. The method of claim 13, wherein the controlling of the output comprises:
receiving an access request to access the security information of the operating system;
determining whether the access request is received from the secure operating system; and
ignoring the access request where the access request is not received from the secure operating system.

17. The method of claim 16, wherein the access request comprises a request to output the security information in a security information output area included in an application execution window or an application execution device, or a request to change content of security information to be output.

18. The method of claim 13, further comprising:
in response to a device driver issuing an access request to use a hardware resource providing security information, determining whether the access request is received from the secure operating system ; and
ignoring the access request where the access request is not received from the secure operating system.

19. The method of claim 18, wherein the access request is made upon installation initialization or update of the device driver.

20. The method of claim 13, wherein
the plurality of operating systems comprise at least one secure operating system in which applications, whose safety has been verified, are installed, and
at least one normal operating system in which applications, whose safety has been not verified, are freely installed;
the server operating system is a secure operating system; and
the security level indicates whether an operating system is a normal operating system or a secure operating system.

21. The method of claim 13, further comprising:
blocking a device driver from accessing the output that provides the security information of the operating system, the device driver being installed in a normal operating system, in which applications, whose safety has been not verified, are freely installed.

22. A non-transitory computer-readable recording medium having a program recorded thereon for implementing a method for supporting a plurality of operating systems executing in a mobile device, the operating systems including a server operating system and at least one client operating system, the method comprising:
reading, at the server operating system, security information indicating a security level of each of the plurality of operating systems;

in response to a window creation request by an operating system, determining whether the operating system on which an application is executed is a secure operating system in which applications, whose safety has been verified, are installed, and controlling, at the server operating system, an output provided via the mobile device that provides security information of the operating system, based on the determining of whether the operating system is a secure operating system, the output comprising at least one of an indication of the security information of the operating system on an application execution screen, an indication of the security information of the operating system on predetermined hardware of the apparatus, a predetermined sound, and a predetermined pattern vibration;

wherein the server operating system determines whether the operating system on which the application is executed attempts to access the security information of the operating system on which the application is executed, in response to determining the operating system on which the application is executed is a non-secure operating system.

23. The non-transitory computer-readable recording medium of claim 22, wherein the plurality of operating systems comprise at least one secure operating system in which applications, whose safety has been verified, are installed, and at least one normal operating system in which applications, whose safety has been not verified, are freely installed;

the server operating system is a secure operating system; and the security level indicates whether an operating system is a normal operating system or a secure operating system.

* * * * *